Nov. 1, 1955  E. W. NEWMAN  2,722,077
PLUG RETRIEVER
Filed Nov. 30, 1950
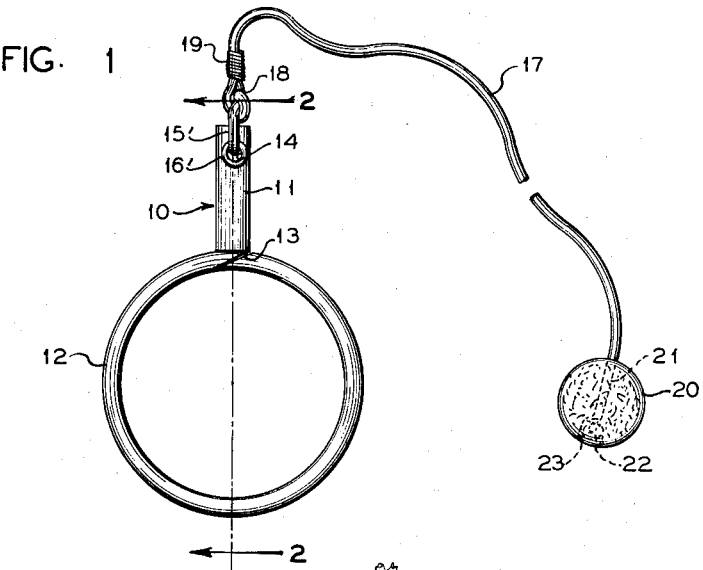
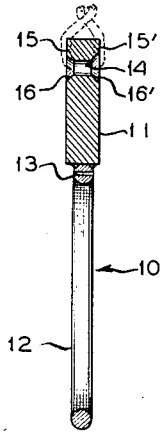
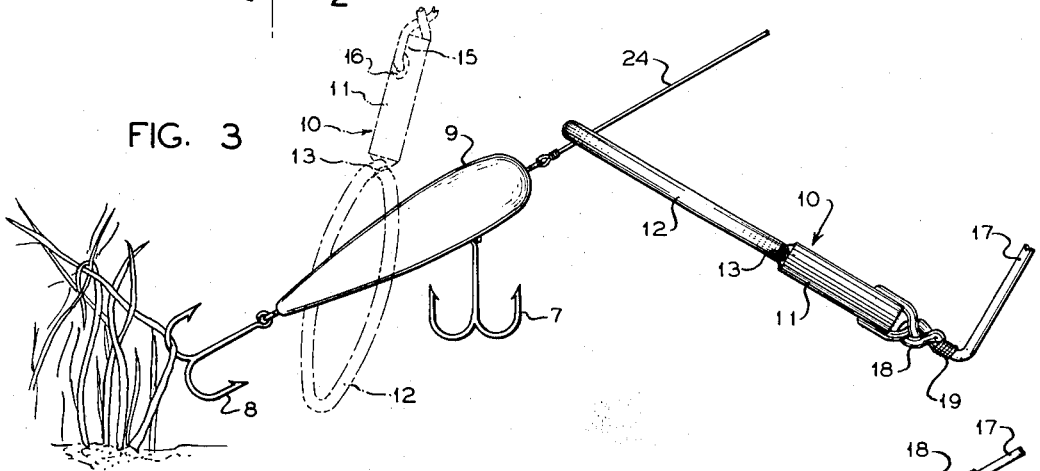
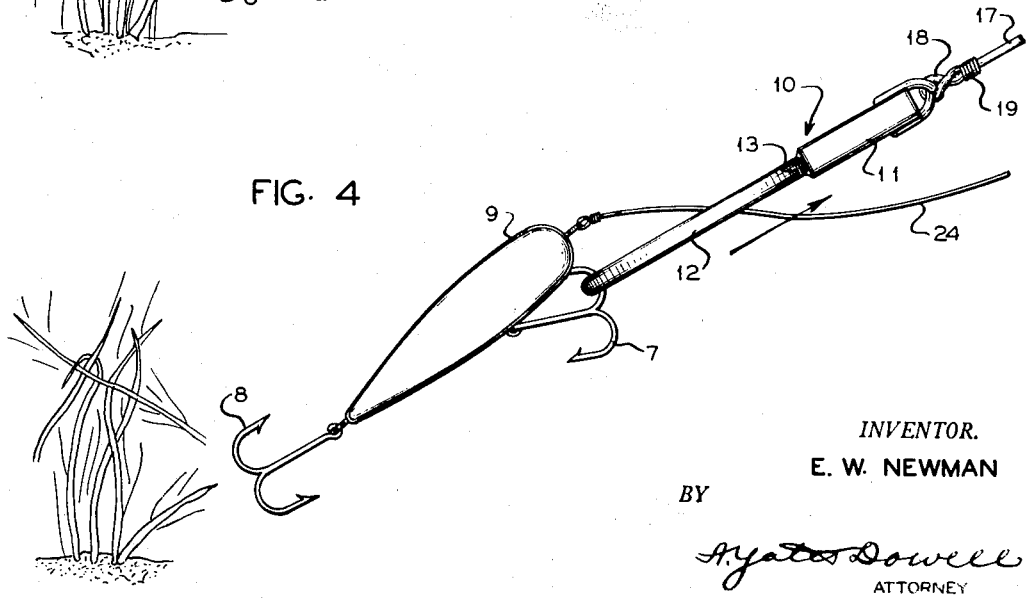
INVENTOR.
E. W. NEWMAN
BY
A. Yates Dowell
ATTORNEY

United States Patent Office 2,722,077
Patented Nov. 1, 1955

2,722,077

PLUG RETRIEVER

Edgar W. Newman, Evansville, Ind.

Application November 30, 1950, Serial No. 198,402

1 Claim. (Cl. 43—17.2)

The present invention relates to a fishing appliance or plug retriever for recovering snagged fish hooks or fishing plugs.

An object of the present invention is to provide a plug retriever which may be used by a fisherman for recovering fish hooks or plugs which may become snagged in weeds, rocks, stumps or other obstructions in or on the bottom of a lake, river, or similar fishing area.

Another object of the present invention is to provide a one-piece plug retriever which is simple to make and easily used by a fisherman.

A further object of the invention is to make a plug retriever of one piece ring-type with a resiliently closed slot which permits the entrance of a fish line by movement of the fish line transversely to its longitudinal direction.

Another object of the present invention is to provide a slot in a ring-type plug retriever at a location closely adjacent to the shank of the retriever whereby a line may be guided by the shank into the slot.

Further objects and advantages of the invention will be apparent from the following description taken in conjunction from the accompanying drawing wherein:

Fig. 1 is a view of the plug retriever with a cord and float attached thereto;

Fig. 2, a sectional view taken on the line 2—2 of Fig. 1;

Fig. 3, a view showing the plug retriever in position on the line and a phantom showing of the plug retriever about to engage the plug; and Fig. 4, a view showing the plug retriever engaging a hook of the plug for pulling the plug loose from a snag.

Referring to the drawing in detail wherein like reference numerals indicate like parts throughout, reference numeral 10 generally designates a plug retriever having a shank 11 with a ring or loop 12 secured to one end of the shank. A slot 13 is formed diagonally through the ring from a point on the outer periphery of the ring adjacent the shank through the ring to the interior thereof. It will be noted that the slot 13 is substantially closed at the inner end thereof and has a flaring entrance at the outer end.

The other end of the shank is provided with a cord-receiving opening 14 extending therethrough. Grooves 15, 15' are provided in the shank and extend from the opening 14 to the other end of the shank. Also, flared entrances 16, 16' are provided in the shank at both ends of the opening 14 and communicate with the grooves 15. A cord 17 of suitable length having one end threaded through opening 14 is secured to the shank 11 by a suitable knot 18 with the end secured to the cord by a wrapping cord or tape 19 in a conventional manner. A float 20 formed of cork or other suitable buoyant material is secured to the other end of the cord by any suitable means, such as threading the cord through a passage 21 and forming a knot 22 which may be received in a recess 23. The plug retriever may be made of any suitable resilient material, such as non-corroding metals, plastics, or the like.

The use of the device is clearly shown in Fig. 3. When the hook 8 of a fishing plug 9 becomes snagged on an obstruction on the bottom of a lake, the fisherman having hold of his fishing pole or line takes the plug retriever in one hand and guides the plug retriever by means of shank 11 against the line and then moves the retriever relative to the line so that the line passes inwardly through slot 13 to the interior of the resilient ring. Holding the cord at any suitable point such as at the float 20, the fisherman allows the ring to slide down the fishing line, as shown in Fig. 3, until the ring is closely adjacent to the plug 9. By suitable jerking motions, the ring is caused to surround the plug, as shown in the phantom view in Fig. 3. Thereafter, the fisherman pulls on the cord 17 to cause the ring of the plug retriever to engage a hook 7 on the plug, as shown in Fig. 4. Thereafter, pulling on the cord 17 will cause the plug 9 to be pulled loose from the obstruction. If desired, the fisherman may pull both on cord 17 of the plug retriever and fish line 24 so as to get the benefit of the strength of the fish line as well as the strength of the cord for pulling the plug loose from the obstruction. In the event the fisherman should accidentally drop the plug retriever, float 20 at the end of cord 17 would remain on the surface of the water within view so that the plug retriever could be recovered.

It will be obvious to those skilled in the art that various changes may be made in the invention without departing from the spirit and scope thereof and therefore the invention is not limited to that which is shown in the drawing and described in the specification, but only as indicated in the appended claim.

What is claimed is:

A fishing appliance comprising a ring of resilient material provided with a lap joint extending substantially perpendicular to the plane of the ring and a shank secured to the ring and projecting outwardly therefrom so that said lap joint has one end in line with an edge of the shank and so that said one end of the lap joint is located on one side of the shank and the other end of the lap joint is located on the other side of the shank, said lap joint being defined by walls diverging outwardly to provide a mouth at said one end of the lap joint which cooperates with the side of the shank to guide the line into the ring.

References Cited in the file of this patent

UNITED STATES PATENTS

| Number | Name | Date |
|---|---|---|
| 685,263 | Decar | Oct. 29, 1901 |
| 1,988,160 | Butte | Jan. 15, 1935 |
| 2,135,771 | Roof | Nov. 8, 1938 |
| 2,155,898 | Harkins | Apr. 25, 1939 |
| 2,397,916 | Bray | Apr. 9, 1946 |
| 2,507,495 | Barthel | May 16, 1950 |
| 2,516,036 | Whitlow et al. | July 18, 1950 |
| 2,528,799 | Strong | Nov. 7, 1950 |
| 2,634,539 | Brown et al. | Apr. 14, 1953 |

FOREIGN PATENTS

| 344,178 | Great Britain | Mar. 5, 1931 |